US011831585B2

(12) United States Patent
Dalmia (10) Patent No.: US 11,831,585 B2
(45) Date of Patent: Nov. 28, 2023

(54) METHOD AND APPARATUS FOR ASYMMETRICAL COMMUNICATION (71) Applicant: Aviva Links, Inc., San Jose, CA (US)

(72) Inventor: Kamal Dalmia, San Jose, CA (US)

(73) Assignee: Aviva Technology Holding, San Jose, CA (US)

( * ) Notice: Subject to any disclaimer, the term of this patent is extended or adjusted under 35 U.S.C. 154(b) by 39 days.

(21) Appl. No.: 17/507,632

(22) Filed: Oct. 21, 2021

(65) Prior Publication Data

US 2022/0131678 A1 Apr. 28, 2022

Related U.S. Application Data (60) Provisional application No. 63/105,124, filed on Oct. 23, 2020.

(51) Int. Cl.
*H04L 5/14* (2006.01)

(52) U.S. Cl.
CPC ....................................... *H04L 5/14* (2013.01)

(58) Field of Classification Search
CPC ............ H04L 5/14; H04L 41/08; H04L 41/50
See application file for complete search history.

(56) References Cited

U.S. PATENT DOCUMENTS

| 10,567,230 | B1* | 2/2020 | Song ........................ H04L 41/12 |
| 10,892,880 | B1 | 1/2021 | Dalmia |
| 11,038,607 | B2 | 6/2021 | Dalmia |
| 2010/0241880 | A1* | 9/2010 | Wertheimer .......... G06F 1/3203 713/310 |
| 2011/0019689 | A1* | 1/2011 | Diab .................... H04L 49/3054 370/462 |
| 2014/0086099 | A1* | 3/2014 | Li ........................... H04L 41/12 370/254 |
| 2019/0081881 | A1* | 3/2019 | Ranjal ..................... H04L 49/25 |
| 2020/0052872 | A1* | 2/2020 | Ran ........................ H04J 3/0658 |
| 2020/0092171 | A1* | 3/2020 | Ramakrishnan ........ H04L 41/12 |
| 2020/0169498 | A1* | 5/2020 | Civil ..................... H04L 45/025 |
| 2020/0412586 | A1* | 12/2020 | McLoughlin ...... H04B 10/0775 |
| 2021/0120418 | A1* | 4/2021 | Jabbar .................. H04L 63/105 |
| 2021/0235325 | A1* | 7/2021 | Desai ................ H04W 72/0453 |
| 2021/0344561 | A1* | 11/2021 | Seewald ............. H04L 41/5003 |

\* cited by examiner

*Primary Examiner* — Bailor C Hsu
(74) *Attorney, Agent, or Firm* — Weide & Miller, Ltd.

(57) ABSTRACT

A method and system for controlling a full-duplex communication system to operate as a time domain duplexing system with dynamic bandwidth allocation. One method includes detecting a change in conditions which necessitates an updated transmit time allocation and generating a LLDP advertisement which reflects the updated transmit time allocation. The initiating port transmits the LLDP advertisement to a link partner to notify the link partner of the updated transmit time allocation and in response, the initiating port receives a link partner LLDP advertisement from the link partner. The updated transmit time allocation is provided to a TCI client and the TCI client updates the reconciliation sublayer with updated transmit time allocation. Then implementing, using the reconciliation sublayer, transmit time allocations for a PHY layer and a MAC layer. Transmitting the data with the PHY layer occurs over a channel during transmit time allocations as defined by the reconciliation sublayer.

15 Claims, 8 Drawing Sheets

ମETHOD AND APPARATUS FOR ASYMMETRICAL COMMUNICATION

FIELD OF THE INVENTION

The invention relates to communication systems and in particular to a method and apparatus for time domain duplexing in a full duplex communication system.

RELATED ART

Transferring information between computers and other electronic devices can be implemented using a variety of different standards and technologies. In many applications, bi-directional Ethernet data transfer is achieved over a pair of transmission lines such that one line is used for data transfer in one direction and the other line is used for transfer in the other direction. In some applications, echo-cancellation is used to transfer data in both directions over a single transmission line.

In environments such as automotive, industrial, and residential, it is desirable to send and receive data over a single transmission line.

Figure 1A:
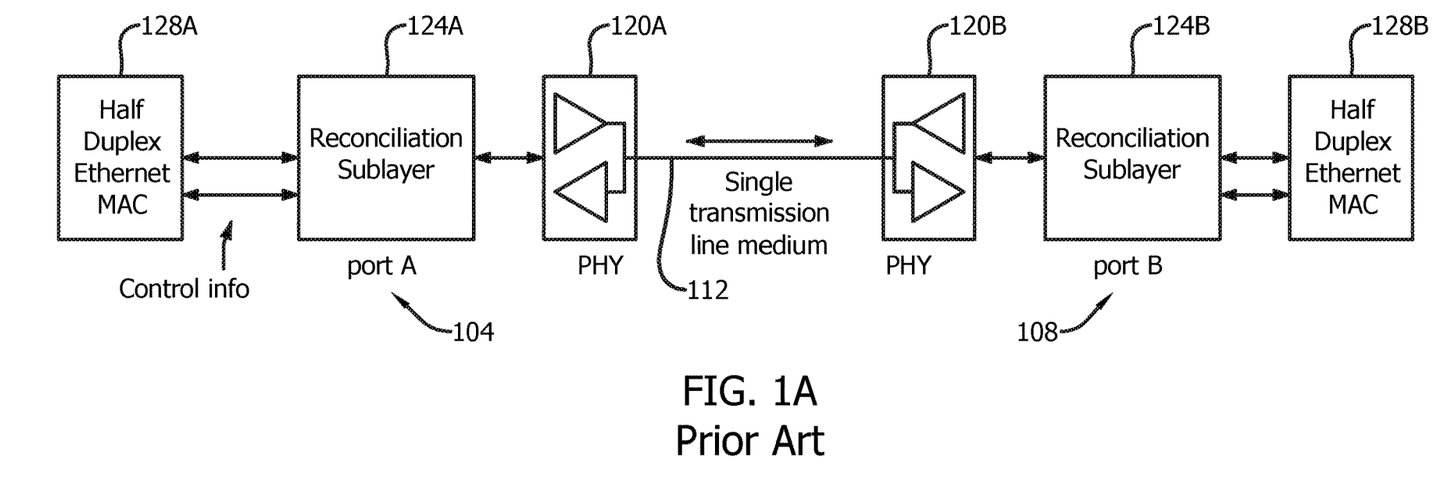
Figure 1B:
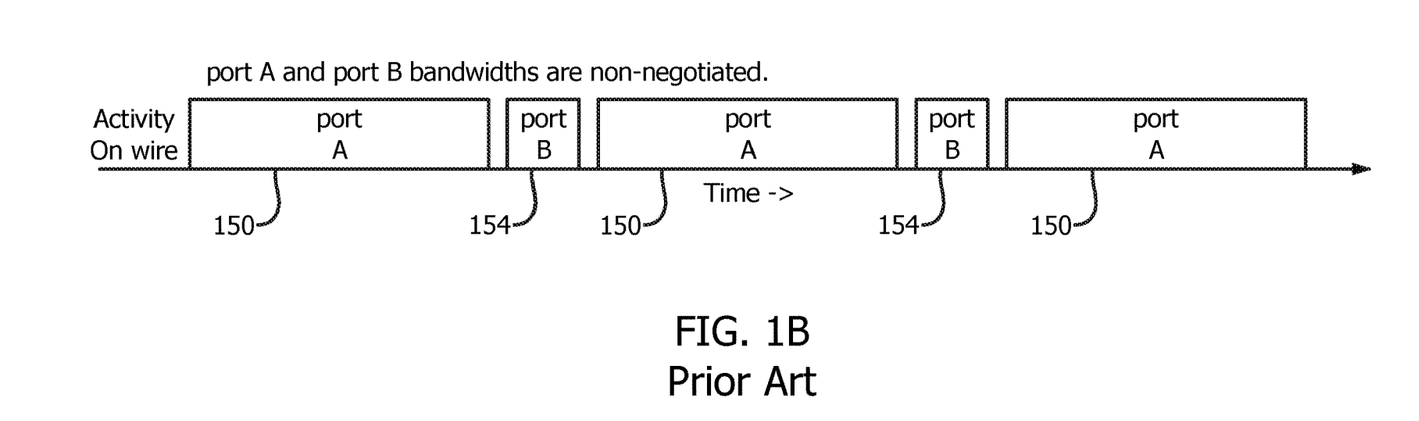

FIGS. 1A and 1B, collectively FIG. 1, illustrates a block diagram of an example embodiment of a full duplex Ethernet communication system. In this embodiment, there are two ports namely, port A 104 and port B 108, which connect and communicate over a channel 112, which in this embodiment is a single transmission line or a multiple conductor line configured as a single channel. The communication system includes two generally similar ports or nodes as shown. Port A 104 includes a PHY 120A that physically connects to the channel. A reconciliation sublayer (RS layer) 124A connects to the PHY 120A to control transmit and receive time allocation for the PHY and other elements. Collectively, the physical layer comprises the PHY 120A and the reconciliation sublayer (RS layer) 124A. Ethernet media access control layer (MAC) 128A provides data to the RS layer 124A. The opposing port B 108 is identically configured and as such is not discussed. The operation of the elements shown in FIG. 1A are generally known and as such are not described in detail. The system of FIG. 1A may be set up as a full duplex communication system or a half-duplex communication system.

FIG. 1B illustrates an exemplary transmit period (time) allocation for a half-duplex communication system. As shown, port A 104 is allocated the transmit time shown by transmit periods 150 while port B 108 is allocated the transmit time shown by transmit periods 154. As can be seen, a greater amount of transmit time 150 is allocated for port A 104 than the port B transmit time 154. This may result when one port has greater bandwidth needs than another port. These transmit period allocations are not adjustable.

In the prior art, if the application requires high bandwidth in one direction and low bandwidth in the other direction. Some Ethernet links employ a mechanism known as Energy Efficient Ethernet (EEE) to implement asymmetrical bandwidth characteristics. Using EEE mechanisms to achieve asymmetry operation requires echo-cancellation. Echo-cancellation is undesirable in many applications due to high-power consumption and complexity (and cost) of the circuitry required to implement this function.

SUMMARY

The present invention relates generally to information networks and specifically to transmitting information over communication transmission lines such as coaxial cable or single twisted-pair cable to form an Ethernet based connection. More specifically, the invention relates to communication between two Ethernet ports configured as full-duplex MACs yet implemented with time domain duplexing of signals on the medium with a mechanism for dynamic bandwidth adjustment.

To overcome the drawbacks of the prior art and provide additional advantages, a method for controlling a full duplex communication system to operate as a time domain duplexing system is disclosed. In one embodiment, this method includes detecting a change in conditions which necessitates an updated transmit time allocation, and then generating an LLDP advertisement which reflects the updated transmit time allocation. This method then transmits the LLDP advertisement to a link partner to notify the link partner of the updated transmit time allocation. In response, a LLDP advertisement is received from the link partner. This method also provides the updated transmit time allocation to a TCI client and provides, from the TCI client, the updated transmit time allocation to a reconciliation sublayer. In response, the reconciliation sublayer controlling transmit time allocations for a physical layer and a MAC layer such that otherwise the MAC layer is a full duplex MAC. Then, transmitting data with the physical layer over a channel during transmit time allocations as defined by the reconciliation sublayer.

In one embodiment, the change in condition is a link failure. In one configuration, the link partner is a port at an opposing end of a channel. It is also contemplated that a LLDP layer provides the LLDP advertisement and data to the MAC layer. A management entity may detect the change in conditions that initiates the method of operation. In one embodiment, the updated transmit time allocation increase an amount of transmit time for one link partner and decreases an amount of transmit time for another link partner. In one configuration, the LLDP advertisement includes a type-length-value based exchange of a local port's maximum burst packet count, requested burst count and max tolerated burst.

Also disclosed is a communication port configured to connect to a channel to be a part of a communication system. The port comprises a management entity configured to detect or receive notice of a fault which initiates a change in bandwidth allocation for the communication port. The port also includes a link layer. The link layer comprises a LLCP layer configured to receive the change in bandwidth allocation from the management entity and, responsive thereto, generate a LLDP advertisement to be sent to another port in the communication system. Also part of the link layer is a TCI client and a MAC layer. The TCI client is configured to process the change in bandwidth allocation from the management entity and generate transmit control instructions. The MAC layer is configured to prepare data for transmission over a channel. A physical layer is also included in the port and it includes a PHY and a reconciliation sublayer. The PHY is configured to connect to the channel and is further configured to transmit data over the channel during transmit time allocations. A reconciliation sublayer is configured to receive the transmit control instructions from the TCI client and, responsive thereto, control the transmit time allocations for the PHY.

In one embodiment, the communication system operates as an Ethernet system. It is proposed that the MAC layer is full duplex but the transmit time allocations controls the PHY to function as a time domain duplex system. In one configuration, the updated transmit time allocation increase an amount of transmit time for one link partner and decreases an amount of transmit time for another link partner. The management entity may comprise machine executable instructions executable by a processor. In some situations, the change in bandwidth allocation is responsive to a link failure or a port failure. It is proposed that the LLDP advertisement includes a type-length-value based exchange of a local port's maximum burst packet count, requested burst count and max tolerated burst.

Also disclosed is a method for dynamically allocating bandwidth to a port of a communication system comprising, detecting a need for bandwidth reallocation, and generating a new bandwidth allocation. Then, generating an LLDP advertisement to be sent to a remote port, and sending the LLDP advertisement to the remote port. This method then provides the new bandwidth allocation to a transceiver transmit controller such that the transceiver transmit control establishes transmit time allocations based on the bandwidth allocation. Then, transmitting data to the remote port with the transceiver during the transmit time allocations, which are controlled by the transceiver transmit controller.

In one embodiment, the port is capable of full duplex communication with the remote port, but the transceiver transmit controller controls the transceiver to be time domain duplexed. It is also contemplated that the transceiver comprises PHY. The transceiver transmit controller may be part of a reconciliation sublayer. The step of detecting a need for bandwidth reallocation and generating a new bandwidth allocation may be performed by a management entity. The need for a bandwidth reallocation may be due to a port failure or a link failure.

The disclosed innovation may also be disclosed as a method and system for bi-directional communication. According to one embodiment, a method comprises configuring the first device (port) to transmit data to a second device (port) in a time domain duplex manner. The ports negotiate and allocate a certain amount of bandwidth up to a maximum advertised to the partner port via LLDP protocol.

The lowest layer, e.g., the physical layer, represents electrically and physically connected (via a single transmission line) transmitters and receivers jointly referred to as PHY and a reconciliation sublayer (RS). The physical layer exchanges data and control signals with the layer directly above, e.g., the data link layer, which includes the Media Access Control (MAC), Logical Link Control (LLC), Link Layer Discovery Protocol (LLDP) MAC client and a Transmit Control Idle (TCI) client. The TCI Client handles PHY level transmission scheduling.

When TCI client sends TCI_IDLE.request to the RS, the RS sends TC IDLEs commands to the PCS, and the PCS sends a handoff signal on the wire and goes silent thereafter. When the PCS receives a handoff signal from the other port, it sends TCI IDLEs to RS. The RS then sends a TCI_IDLE.indication to TCI Client. Following this, the RS allows the MAC to transmit data on the line.

As disclosed herein, LLDP messaging is performed according to IEEE 802.3 Clause 79. The LLDP information may be sent in the form of Ethernet frame. Each frame may contain one LLDP Data Unit (LLDPDU). Each LLDPDU may be a sequence of type-length-value (TLV) structures. TLV contains max burst count, requested burst count, and max burst tolerated information. Alternatively, ports can advertise max time or max bit/byte/word count.

When implemented in a ring network, a node may employ an Ethernet switch (SW) with two ports such that one port acts as a "main port" and sends data at a higher rate than the other port. In the event of a failure of the main port, the network reconfigures itself such that the other port starts sending the data carried by the main port and subsequent ports in the ring adjust their allocation of bandwidth on a pair by pair basis.

Other systems, methods, features and advantages of the invention will be or will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIGS. 1A and 1B, collectively FIG. 1 is a timing diagram of a conventional time domain duplex based communication using half-duplex MAC.

DETAILED DESCRIPTION

To overcome the drawbacks of the prior art and provide additional benefits, it is proposed to provide a system and method that achieves asymmetrical bandwidth allocation without employing complex power consuming echo-cancellation and EEE mechanism, while maintaining compatibility with MAC defined in IEEE 802.3 Annex 4A. In some applications, such as automotive in-vehicle networking, Ethernet nodes arranged as described herein may be arranged in a ring topology. Ring topology may be used provide redundant paths and resilience against certain network component failures. Any network topology may be used with the innovation disclosed herein. For example, if a sensor, for example a camera, is relied upon in a self-driving automobile, then failure to receive important camera data may result in the automobile's self-driving function being deemed inoperable or an accident may occur.

Conventional protocols such as Media Redundancy Protocol (MRP) and Parallel Redundancy Protocol (PRP) include two network ports for each node. Such nodes send and receive duplicate data over both ports simultaneously to achieve redundancy. Conventional ring networks use Ethernet ports that are symmetrical in nature. In a network using ports that feature asymmetrical bandwidth allocation, it is desirable that when dynamically allocating bandwidth from one port to the other port of a given node based on the preferred bandwidth allocation for node to node communication and in the event of a failure or other condition that necessitate a bandwidth reallocation.

Figure 2A:
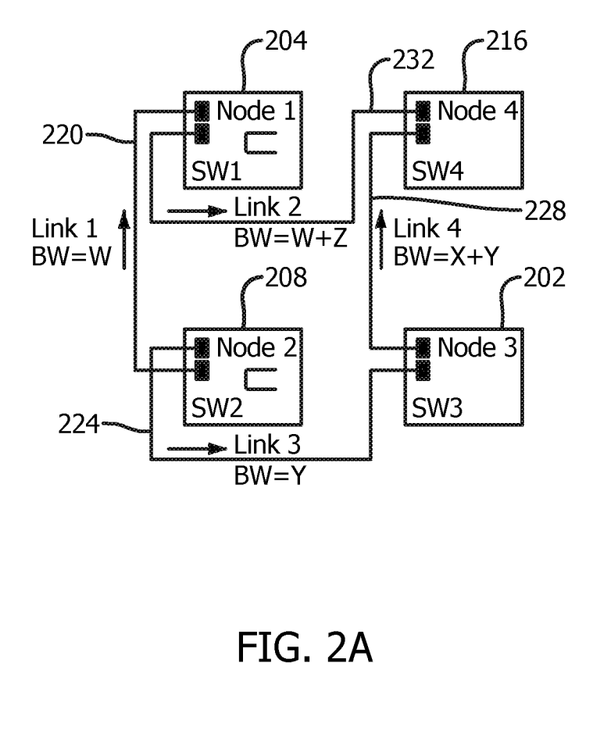
FIG. 2A illustrates an exemplary communication system with a ring topology while unaffected by link or node failure.

FIG. 2A illustrates an exemplary communication system with a ring topology while unaffected by link or node failure. This is but one example embodiment and is provided to aid in understanding. Other communication systems may be implemented with the system and method disclosed herein. As shown, there are four nodes 204, 208, 212, 216 which represent communication transmitters, receivers, or transceivers. Each node has two communication ports, each of which connect to a different node. The nodes 204, 208, 212, 216 communicate over links (channels) 220, 224, 228, 232. Node 1 204 and node 2 208 communicate over link 1 220. Node 2 208 and node 3 212 communicate over link 3 224. Node 3 212 and node 4 216 communicate over link 4 228. Node 3 212 and node 1 204 communicate over link 2 232.

During operation without any faults or non-functional elements, link 1 220 operates at a bandwidth W to meet the needs of node 2 208 and node 1 204. Link 2 232 operates at bandwidth W+Z to meet system needs. Link 3 224 operates at bandwidth Y to meet system needs. Link 4 228 operates at bandwidth X+Y to meet system operation.

In this example system, it may be helpful to consider node 1 204 and node 2 208 as cameras which generate camera data. Node 4 216 may be considered as a processor which processes the camera data. With this node assignment, camera node 2 208 sends its camera data, requiring bandwidth Y, to the processor node 4 216 via nodes 3 212, as well as through a redundant path over link 1 220 through node 1 204 as bandwidth W. During operation, data transmission occurs as expected without interruption.

Figure 2B:
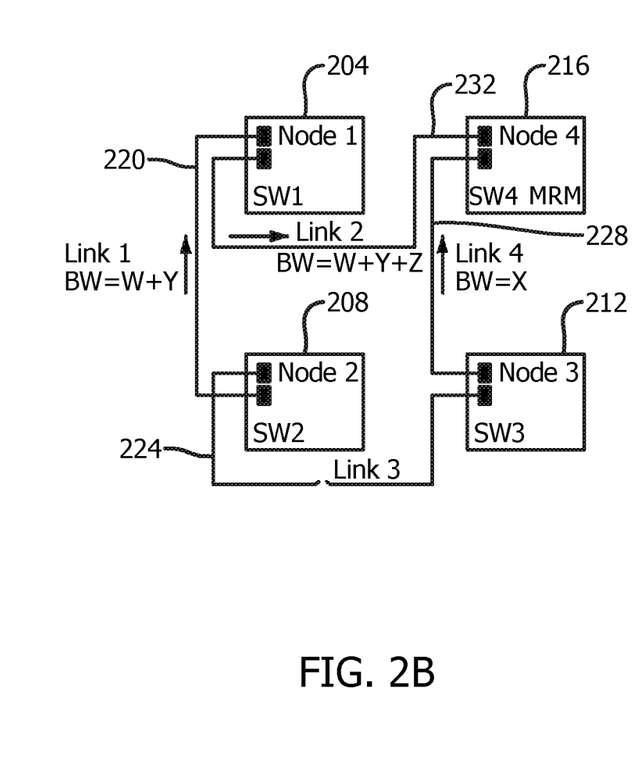
FIG. 2B illustrates an exemplary communication system with a ring topology while affected by link or node failure.

FIG. 2B illustrates an exemplary communication system with a ring topology that is affected by link or node failure. As a result of any type failure, link 3 224 is unable to carry data traffic. The data from node 2 208 must be re-routed. As a result, the link 1 bandwidth must increase from W to W+Y to account for the failed link bandwidth which would have been carried over the failed link 3 224. Likewise, node 3 212 is no longer receiving data over link 3 224, so the bandwidth carried by link 4 228 may be reduced to bandwidth W. In addition, the bandwidth carried by link 2 232 must dynamically be increased to accommodate the system failure, and as such it is increased to bandwidth W+Y+Z.

Based on this discussion of the network bandwidth allocations between different network nodes (sensors and processors for example) and the need for dynamic bandwidth allocation to changed network environments, it is apparent that there is a need for a network system and protocol which can adapt to these situations.

Figure 3A:
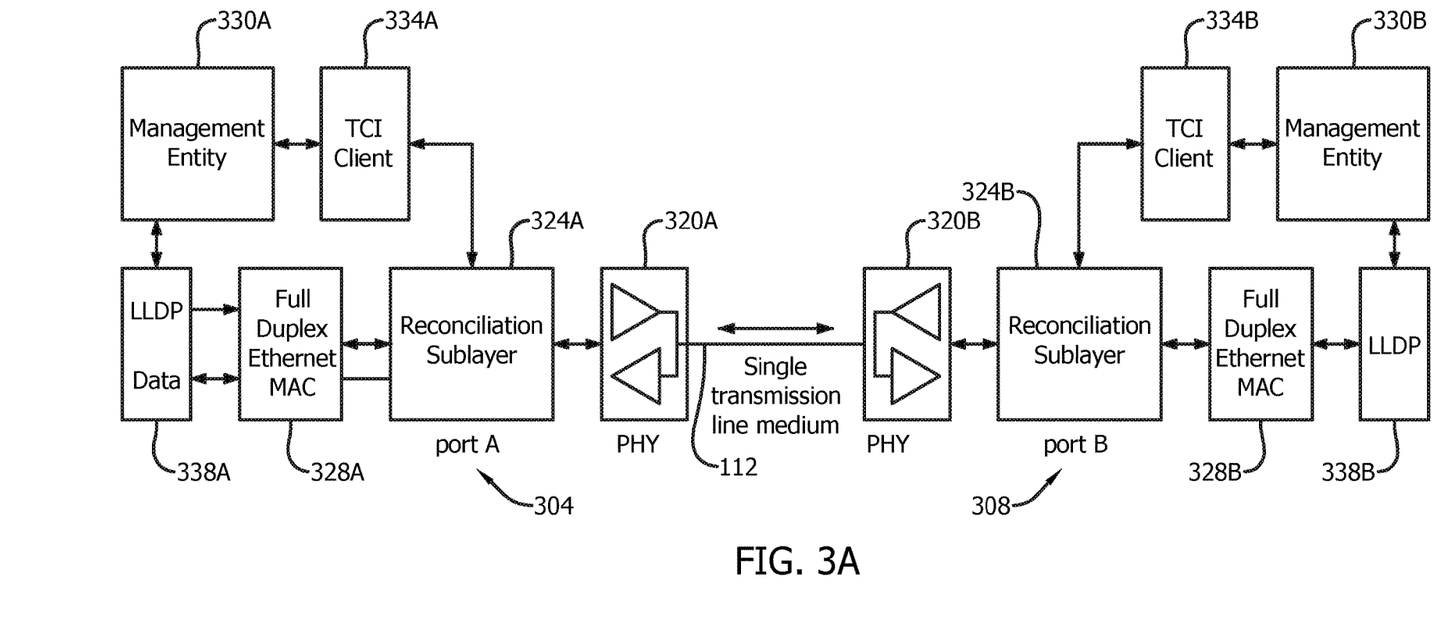
FIG. 3A illustrates a block diagram of an example method of a full duplex communication system configured for time domain duplexing.

FIG. 3A illustrates a block diagram of an example method of a full duplex communication system configured for time domain duplexing. This is but one possible configuration, and as such it is contemplated that one of ordinary skill in the art may arrive at different embodiments that do not differ from scope of the claims. As compared to FIG. 1A, identical elements are labeled with identical reference numbers and operation of certain elements are generally similar. As shown, the channel 112 connects port A 304 and port B 308. Port A 304 is described with the understanding that port B 308 operates in a generally similar manner. The channel 112 connects to a PHY 320A and the PHY connects to a reconciliation sublayer (RS) 324A. A full duplex MAC 328A communicates with the RS 324A to achieve data communication from the MAC to the RS, and over the PHY 320A to the channel 112. The general operation of these elements is known in the art and as such is not described again.

As an improvement over the prior art and to provide additional benefits, also included is a management entity 330A which communicates with a TCI client 334A and a LLDP (link layer discover protocol) 338A. The management entity 330A may be any arrangement of software, hardware, or both. The terms software should be understood to mean machine readable instructions, also referred to as machine executable instruction, which are stored in a memory, in a non-transitory state, and executable by a processor. The management entity 330A is configured to detect or determine when a change in bandwidth allocation to a port should occur or receive that decision from another entity and convey the change to the TCI (transmit control idle) client 334A and the LLDP 338A. The management entity 330A may calculate or determine the bandwidth allocation for each port, or it may be provided the allocation from a higher layer or other element.

In the example situation shown in FIG. 2B, a broken link or a failed port may be detected by the management entity 330A or reported to the management entity from a node or other element. In response, the management entity initiates a bandwidth reallocation processes (described below in FIG. 6) to modify the bandwidth assigned to port A 304 and port B 308. The change in bandwidth allocation may also be referred to as changing the transmit time allocation in a time domain duplex. In response to a change in conditions that initiates a bandwidth re-allocation, the management entity provides a change in transmit timing signal or other notification to the TCI client 334A, which in turn changes its control settings to adjust the transmit enable and disable signals to the RS 324A. The RS 324A controls when data to be transmitted from the MAC 328A is provided to the PHY 320A for transmission. By communicating the updated transmit timing allocations from the management entity 330A to the TCI client 334A, and then to the RS 324A, the bandwidth allocation to each port is dynamically updated.

Similarly, the management entity 330A also communicates the updated transmit timing allocations to the LLDP 338A which is configured to communicate updated transmit timing allocations to port B 308 so that port B can likewise adjust its transmit and receive windows to match port A 304. This is discussed in greater detail in connection with FIGS. 6 and 7.

Figure 3B:
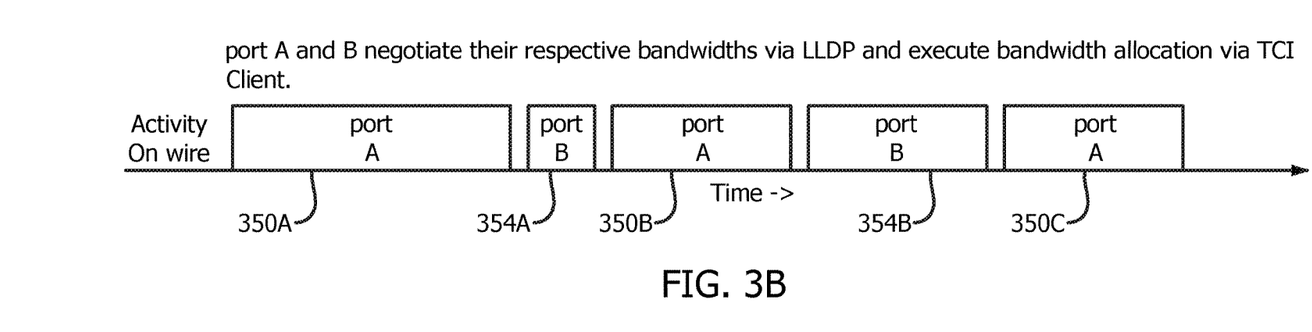
FIG. 3B illustrates exemplary transmit timing allocations based on the embodiment of FIG. 3A.

FIG. 3B illustrates exemplary transmit timing allocations based on the embodiment of FIG. 3A. During a transmit period 350A and 354A, port A and port B are assigned a fixed amount of time. However, after transmit period 354A, a change in system operation initiates a change in the transmit period allocation such that at transmit period 350B port A is assigned a reduced transmit time and port B, at transmit period 354B, has its transmit period time increased. At transmit period 350C the transmit period allocation for port A may be maintained the same or updated.

Figure 4:
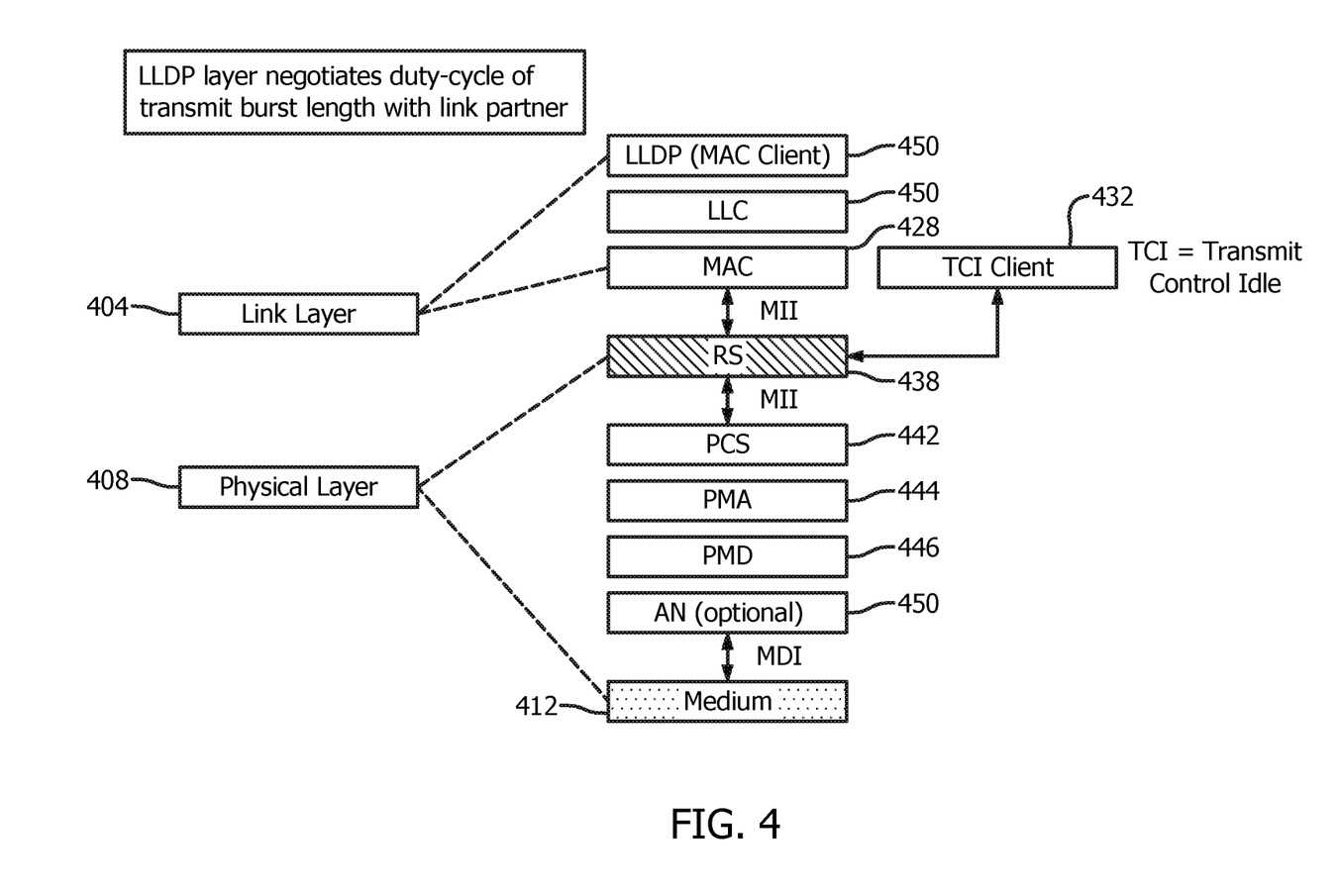
FIG. 4 illustrates the layers and sub-layers of an Ethernet port configured according to the innovation described herein.

FIG. 4 illustrates the layers and sub-layers of an Ethernet port configured according to the innovation described herein. This is but one possible layer arrangement and in other embodiments other layer arrangements may be implemented. At a high level, there are two primary layers, namely the link layer 404 and a physical layer 408. Also shown is the medium 412, such as a channel. The innovation described herein may be used with any type channel such as a wireless or wired channel, or optic channel. Any wired or optic channel type may be used, and any communication standard may be implemented.

The link layer 404 includes the following sublayers such as the LLDP 420, LLC (link layer control) 424, and the MAC 428. The TCI client 432 is also part of the link layer 404. The physical layer includes the reconciliation sublayer 438, the PCS (physical coding sublayer), the PMA (physical medium attachment) 444, the PMD (physical medium dependent) 446, and an optional AN layer (auto negotiation) 450 to perform an auto negotiation of the initial link parameters or to establish updated parameters in response to an updated bandwidth allocation. The AN 450 is typically used for exchange of PHY parameters during initial set up of the link and to change parameters requires a "link drop" and re-establishment of link which is not desirable. Hence, it can not be used for dynamic re-allocation of bandwidth, which does not require or rely on a link drop for re-allocation of bandwidth.

Aspects of the layer structure shown in FIG. 4 which are known in the art are not described in detail. The layer structure of FIG. 4 illustrates where the LDDP 420, TCI client 432 and RS 438 are arranged in the link layer 404 and the physical layer 408. Operation occurs as described herein.

Figure 5:
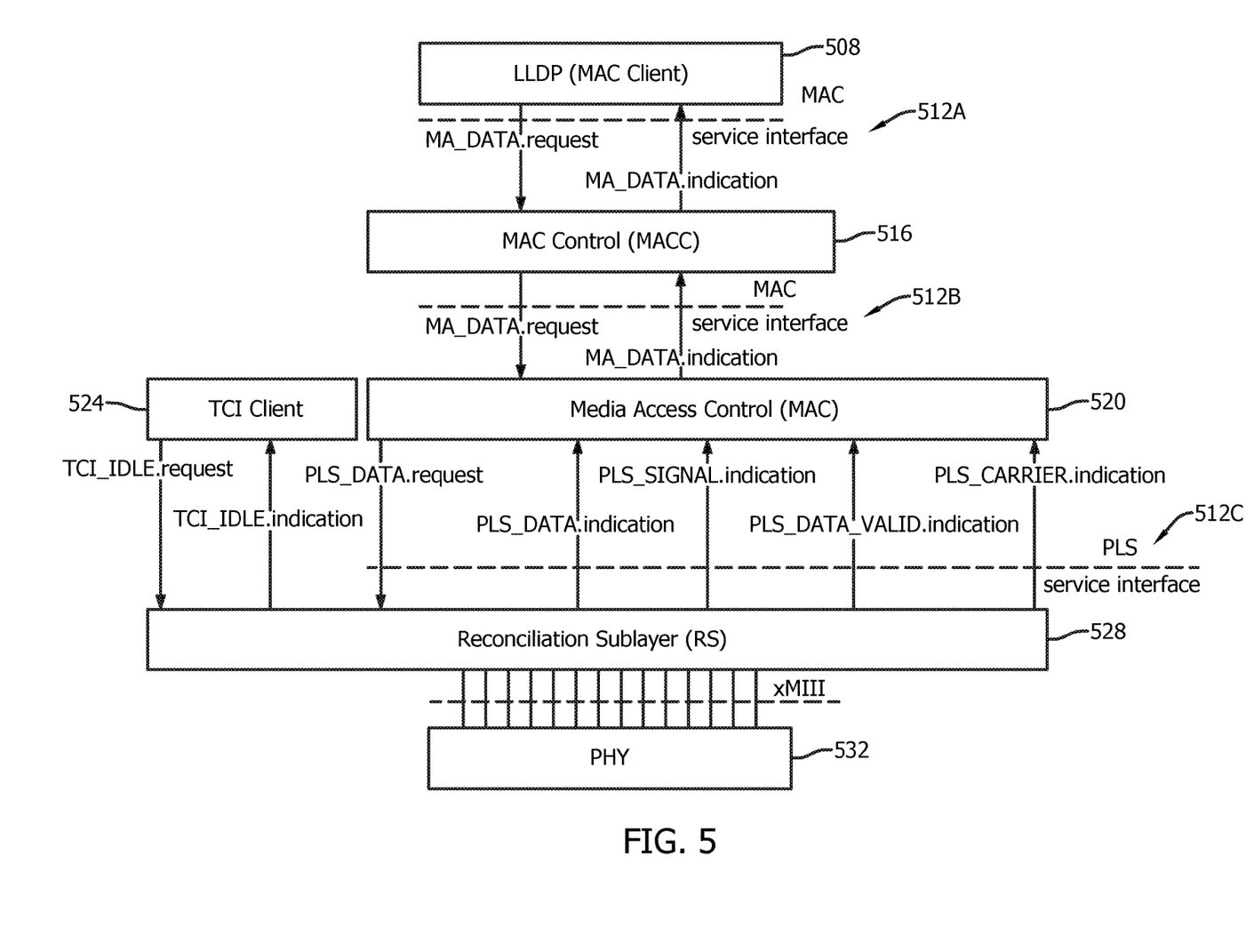
FIG. 5 depicts signaling interfaces between various layers and sub-layers of an Ethernet port.

FIG. 5 depicts signaling interfaces between various layers and sub-layers of the Ethernet port. As shown, the LLDP 508, which is a MAC client, communicates the MAC control (MACC) sublayer 516 to send updated transmit timing signals to the opposing port, such as port B. Communication between layers occur based on an IEEE standard, referred to as a service interface 512A, 512B, 512C. In turn, the MAC control layer 516 communicates with the media access control (MAC) layer 520. The MAC layer 520 sends the updated transmit timing signals to the reconciliation sublayer (RS) 528. Also providing control signals to the RS 528 is the TCI client 524. The control signal sent by the TCI client controls when the RS 528 will allow the MAC 520 to access, and thus transmit over the PHY 532.

As discussed above, the TCI client 524 updates the RS 528 with the new transmit timing control signal that defined the bandwidth allocation (transmit time duration). In turn, the RS 528 uses the updated transmit timing signal to selectively grant access by the MAC to the PHY for the given updated transmit period. The management entity or other control signal source provides the updated transmit timing values to the TCI client 524 and to the LLDP 508. The opposing terminal receives the updated transmit and receives parameters and updates it functions in a manner similar or identical to that described for the port initiating the change in the transmit timing parameters. It is contemplated that either port may initiate the change.

Figure 6:
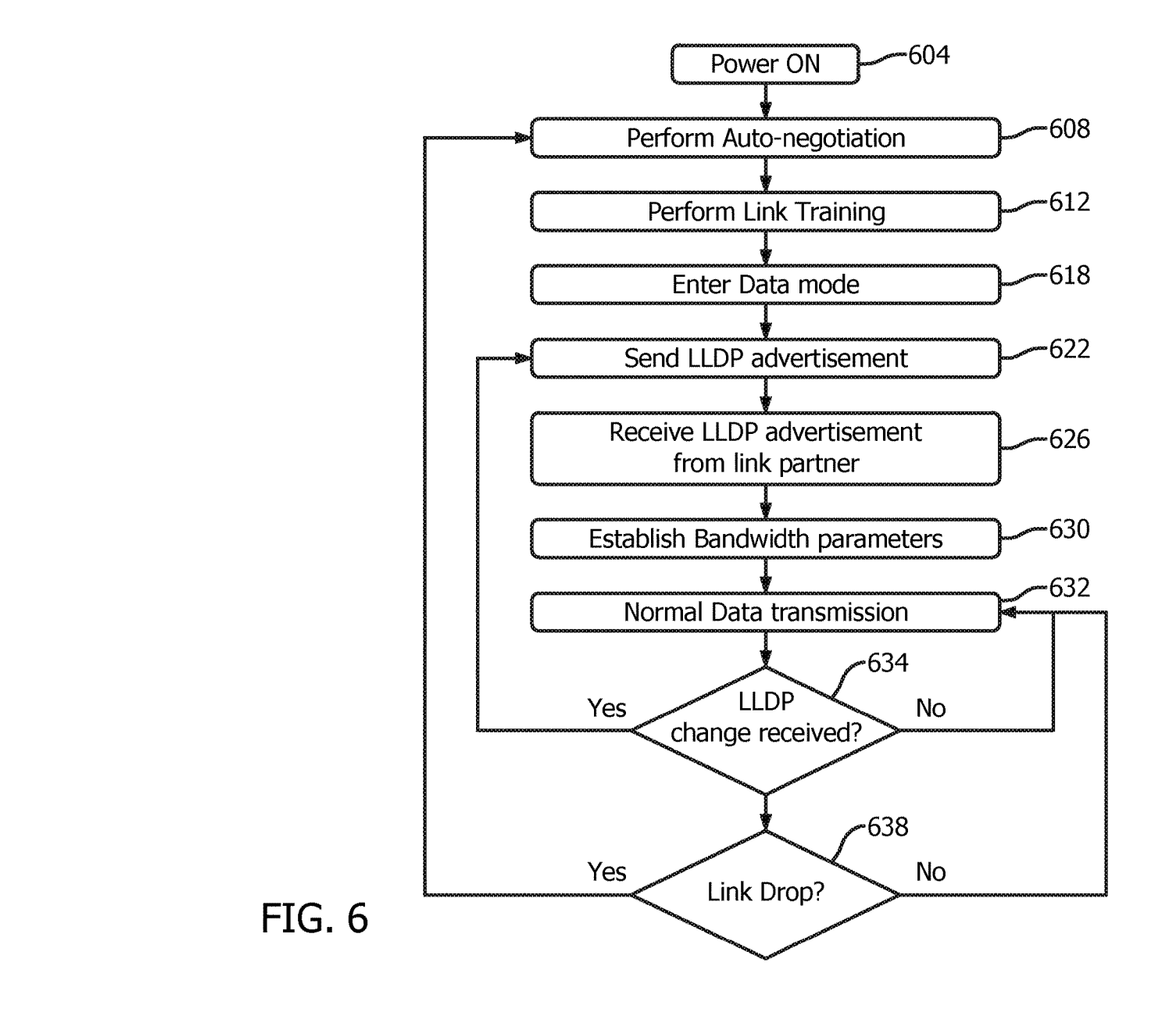
FIG. 6 depicts an example method of operation of port bring-up and LLDP messaging.

FIG. 6 depicts an example method of operation of port bring-up and LLDP messaging. This is but one exemplary method of operation and it is contemplated that other methods of operation may be enabled by one of ordinary skill in the art. In reference to FIG. 6, at a step 604 the system is powered on or otherwise activated for data communication or to establish the link. Then, at a step 608, the communication systems, typically two interconnected ports which may be referred to as link partners, perform auto negotiation to exchange data communication parameters and technically acceptable transmit and receive periods. The initial setting may be based on default values. At a step 612 the system performs link training to configure and optimize one or more aspects of the communication system for the actual channel in use. This may include establishing equalizer coefficients or other related link related parameters. One or more initial settings for the communication system developed at steps 608 and 612 may be based on predetermined values. For example, an initial transmit time allocation may be pre-established for each port based on stored values, but these may be changed as discussed below in subsequent steps.

At a step 618, the communication system enters data communication mode and conducts data communication based on the results of the auto-negotiation and link training discussed above. Data communication occurs, as is understood in the art, in an Ethernet or other type communication system. Next, at step 622, a change in the communication system, such as but not limited to a failed communication link, may initiate a change in transmit time allocations to accommodate different bandwidth requirements for one or more ports. As a rest, a LLDP advertisement may be sent from one port to an opposing port. The LLDP advertisement is a notice from the initiating port to the other port that a change in transmit parameters is being established. If the transmit time window at one port is being expanded or contracted, then the opposing port must also be made aware of and accept the updated parameters. This step may include the communication of the changes from the management entity to the TCI client and the LLDP so that the opposing terminal and the reconciliation sublayer may update their settings to execute the change.

At a step 626, the initiating terminal receives from its link partner, the LLDP advertisement. This is a communication from the link partner that it has accepted the changes and provides the new transmit parameters from the opposing link partner. At a step 630, the link partners establish the bandwidth parameters as set forth in the LLDP advertisement. Both terminals or ports of the link are aware of the opposing side's transmit and receive windows and the duration of each.

Then, at a step 632, normal data transmission resumes with the new transmit periods as established by the LLDP advertisement. Data may continue for any amount of time based on the transmit period parameters which account for the new system environment, such as a broken link or a change in bandwidth requirements for a particular port.

At a decision step 634, a determination occurs whether an LLDP change is requested or received. The LLDP change may be initiated from the management entity (FIG. 3, element 330), or any other elements. If, at step 634, a LLDP change request is received, then the operation returns to step 622 and the changed LLDP request is sent to the link partner and the originating LLDP change terminal also updates its internal settings, such as by the TCI sublayer notifying the reconciliation sublayer. Alternatively, if at decision step 634 a LLDP change has not been received, then the operation returns to step 632 and data communication continues to occur without change.

Next, at a decision step 638 the determination is made whether the link has been dropped. A dropped link is defined as any event that interferes with communication over a link which sufficiently disrupts communication to requiring that auto-negotiation and link training occur to re-establish the communication link. If the link has been dropped, then the method returns to step 608, and the system performs an auto negotiation, and the steps continue as described above. Alternatively, if the link was not dropped at step 638, then the operation returns to step 632 and data communication continues.

Figure 7:
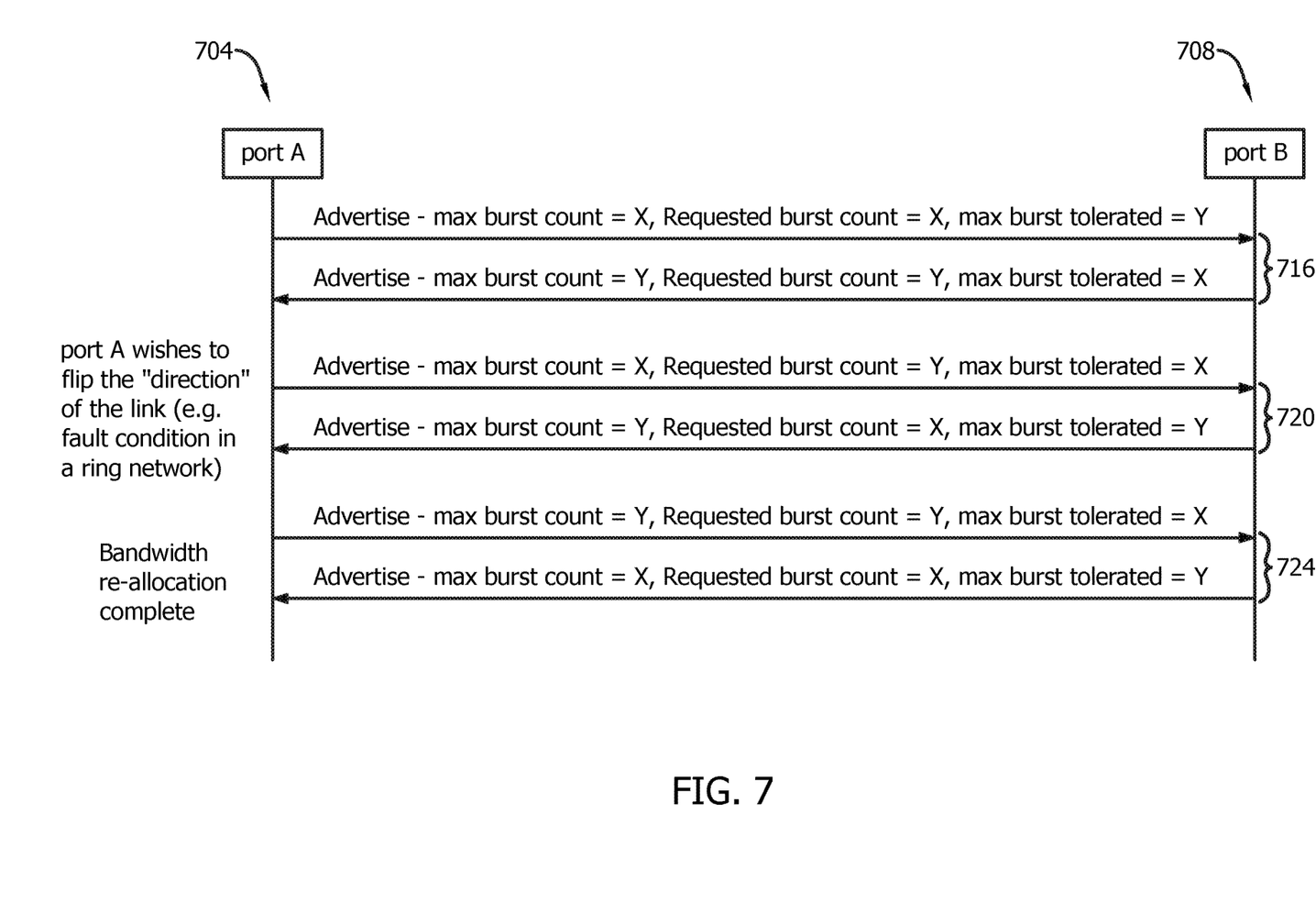
FIG. 7 depicts an example process of LLDP messaging between two ports, according to one embodiment.

FIG. 7 depicts an example process of LLDP messaging between two ports. In this embodiment, two ports 704, 708 are shown and these ports communicate over a channel. As part of the LLDP change request, messaging occurs between the two ports. This messaging is illustrated in FIG. 7. During a first LLDP messaging session 716, port A 704 advertises its capabilities to port B 708, and in response port B advertises its capabilities to port A. In this situation, port A 704 is the initiating port. The advertised information is a maximum burst count, a requested burst count and a maximum burst that can be tolerated. This same type of information is exchanged during every shown LLDP change request.

During a second LLDP messaging session 720, port A 704 advertises its capabilities to port B 708 and in response, port B advertises its capabilities to port A. In this messaging session, the values for the maximum burst count, a requested burst count and a maximum burst are changed. Port B 708 responds according with updated values.

During a third LLDP messaging session 724, port A 704 advertises its capabilities to port B 708 and in response, port B advertises its capabilities to port A. In this messaging session, the values for the maximum burst count, a requested burst count and a maximum burst are changed. Port B 708 responds accordingly with updated values.

Figure 8:
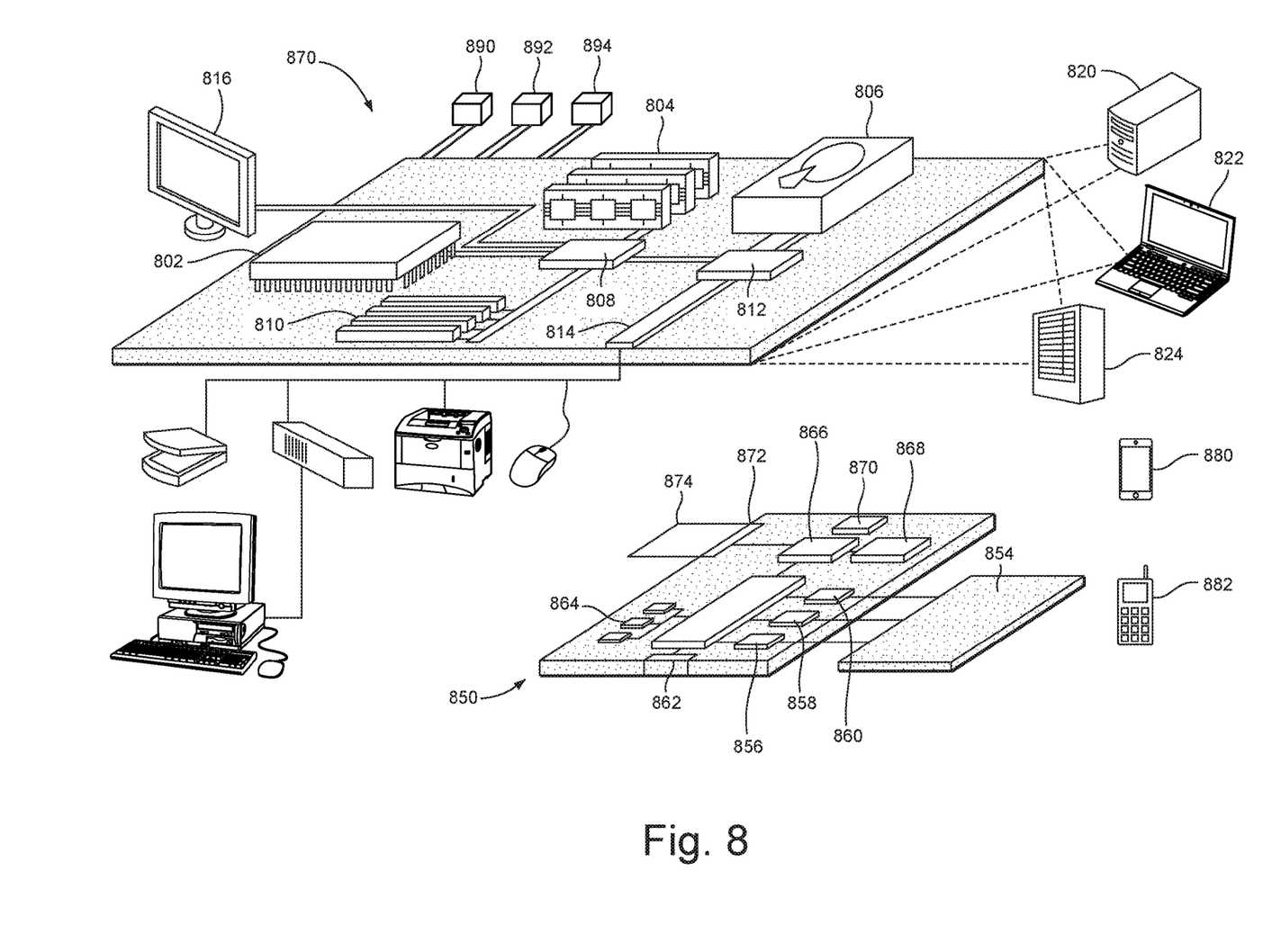
FIG. 8 is a schematic of a computing or mobile device such as one of the devices described above, according to one exemplary embodiment

FIG. 8 is a schematic of a computing or mobile device, or server, such as one of the devices described above, according to one exemplary embodiment. The computing device shown in FIG. 8 may be part of an automobile or other autonomous vehicle or autonomous device (collectively a vehicle), such as but not limited to an automobile, truck, drone, helicopter, plane, robot, tank, ATV, boat, submarine, monitoring station, space craft, hybrid craft, construction or mining equipment, or any other vehicle having sensors linked to a processor by a network. FIG. 8 shows an example of a computing device 870 and a mobile computing device 850, which may be used with the techniques described here. Computing device 870 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit the implementations described and/or claimed in this document.

Computing device 870 includes a processor 802, memory 804, a storage device 806, a high-speed interface or controller 808 connecting to memory 804 and high-speed expansion ports 810, and a low-speed interface or controller 812 connecting to low-speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 870, including instructions stored in the memory 804 or on the storage device 806 to display graphical information for a GUI on an external input/output device, such as display 816 coupled to high-speed controller 808. In other implementations, multiple processors and/or multiple buses may be used, as appropriate, along with multiple memories and types of memory. Also, multiple computing devices 870 may be connected, with each device providing portions of the necessary operations (e.g., as a server bank, a group of blade servers, or a multi-processor system).

The memory 804 stores information within the computing device 870. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 870. In one implementation, the storage device 806 may be or contain a computer-readable medium, such as a hard disk device, an optical disk device, or a tape device, a flash memory or other similar solid-state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high-speed controller 808 manages bandwidth-intensive operations for the computing device 870, while the low-speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed bus 814. The low-speed bus 814, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 870 also includes one or more sensors configured to collect data and provide the data to the processor 802 or other processing element in the computing device. The sensors may comprise any type sensor including but not limited to a camera 890, a radar sensor 892, and a LIDAR sensor 894. Other sensor are contemplated such which may now exist or be developed in the future. Sensors in Autonomous vehicles allow the vehicle to 'see and sense' everything on and around the road, as well as to collect the information needed in order to drive safely. Furthermore, this information is processed and analyzed in order to build and execute a path from point A to point B and to send the appropriate instructions to the controls of the car, such as steering, acceleration, and braking.

The computing device 870 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 870 may be combined with other components in a mobile device (not shown), such as device 850. Each of such devices may contain one or more of computing device 870, 850, and an entire system may be made up of multiple computing devices 870, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850 or may also store applications or other information for device 850. Specifically, expansion memory 874 may include instructions to carry out or supplement the processes described above and may include secure information also. Thus, for example, expansion memory 874 may be provide as a security module for device 850 and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, Wi-Fi, or other such transceiver (not shown). In addition, GPS (Global Positioning system) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smart phone 882, personal digital assistant, a computer tablet, or other similar mobile device.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system (e.g., computing device 870 and/or 850) that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

For purposes of explanation, this description, uses specific nomenclature to provide a thorough understanding of the invention. However, it will be apparent to one skilled in the art that specific details are not required in order to practice the invention. Thus, the descriptions of specific embodiments of the invention are presented for purposes of illustration and description. They are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement. The present disclosure should be understood to not be limited to the particular forms disclosed, but on the contrary, the intention is to cover all modifications, equivalents, and alternatives falling within the spirit and scope of the present disclosure.

What is claimed is:

1. A method performed by local link partner for controlling a full duplex communication system to operate as a time domain duplexing system comprising:
    generating a link layer discovery protocol (LLDP) advertisement which reflects an updated transmit time allocation;
    transmitting the LLDP advertisement to a remote link partner to notify the remote link partner of the updated transmit time allocation;
    receiving a LLDP advertisement from the remote link partner;
    providing the updated transmit time allocation to a transmit control idle (TCI) client;
    providing, by the TCI client, the updated transmit time allocation to a reconciliation sublayer;
    controlling, with the reconciliation sublayer, transmit time allocations for a physical layer and a media access (MAC) layer, such that operation of the MAC layer is otherwise full duplex; and
    transmitting data with the physical layer over a channel during transmit time allocations as defined by the reconciliation sublayer.

2. The method of claim 1 wherein the change in condition is a link failure.

3. The method of claim 1 wherein the remote link partner is a port at an opposing end of a channel.

4. The method of claim 1 wherein a LLDP layer provides the LLDP advertisement and data to the MAC layer.

5. The method of claim 1 wherein a management entity detects the change in conditions.

6. The method of claim 1 wherein the updated transmit time allocation increases an amount of transmit time for one link partner and decreases an amount of transmit time for another link partner.

7. The method of claim 1 wherein the LLDP advertisement includes a type-length-value based exchange of a local port's maximum burst packet count, requested burst count and max tolerated burst.

8. The method of claim 1, further comprising detecting a change in an amount of received data over a period of time which necessitates an updated transmit time allocation.

9. A communication port, configured to connect to a channel to be a part of a communication system, comprising:
    a management entity configured to detect, or receive notice of, a fault which initiates a change in bandwidth allocation for the communication port;
    a link layer comprising:
        a link layer control (LLC) entity configured to receive the change in bandwidth allocation from the management entity and, responsive thereto, generate a link layer discovery protocol (LLDP) advertisement to be sent to another port in the communication system;
        a transmit control idle (TCI) client configured to process the change in bandwidth allocation from the management entity and generate transmit control instructions;
    a media access (MAC) layer configured to prepare data for transmission over a channel;
    a physical layer comprising:
        a PHY, configured to connect to the channel, the PHY configured to transmit data over the channel during transmit time allocations; and
        a reconciliation sublayer, the reconciliation sublayer configured to receive the transmit control instructions from the TCI client which controls the transmit time allocations for the PHY.

10. The communication port of claim 9 wherein the communication system operates as an Ethernet system.

11. The communication port of claim 9 wherein operation of the MAC layer is a full duplex but the transmit time allocations controls the PHY to function as a time domain duplex system.

12. The communication port of claim 9 wherein the change in bandwidth allocation increases an amount of transmit time for one link partner and decreases an amount of transmit time for another link partner.

13. The communication port of claim 9 wherein the management entity comprises machine executable instructions executable by a processor.

14. The communication port of claim 9 wherein the change in bandwidth allocation is responsive to a link failure or a port failure.

15. The communication port of claim 9 wherein the LLDP advertisement includes a type-length-value based exchange of a local port's maximum burst packet count, requested burst count and max tolerated burst.

\* \* \* \* \*